Sept. 6, 1966  J. H. BULLENS  3,270,403
METHOD OF MAKING A SPOKED WHEEL
Filed June 14, 1963  2 Sheets-Sheet 1
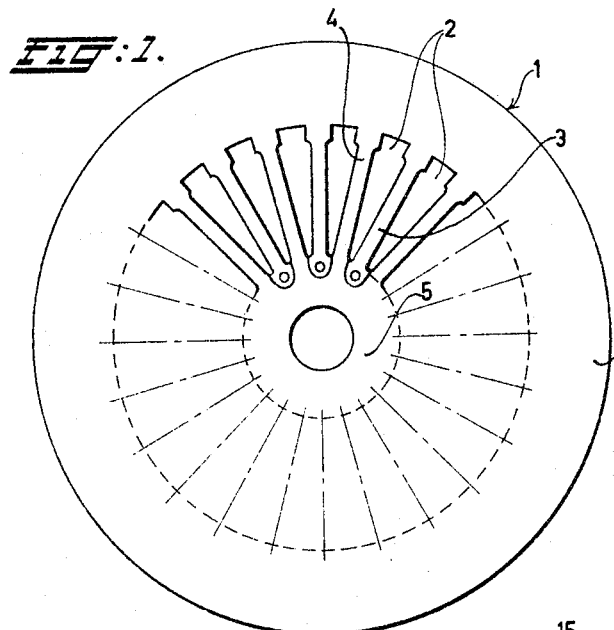
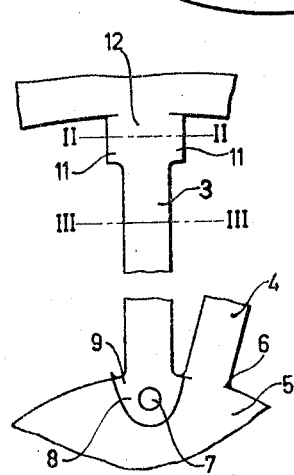
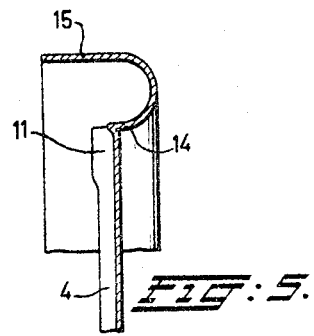
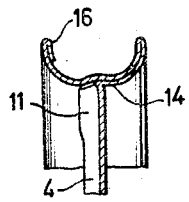
INVENTOR.
JOHANNES H BULLENS
BY
ATTORNEY Sept. 6, 1966   J. H. BULLENS   3,270,403
METHOD OF MAKING A SPOKED WHEEL
Filed June 14, 1963   2 Sheets-Sheet 2
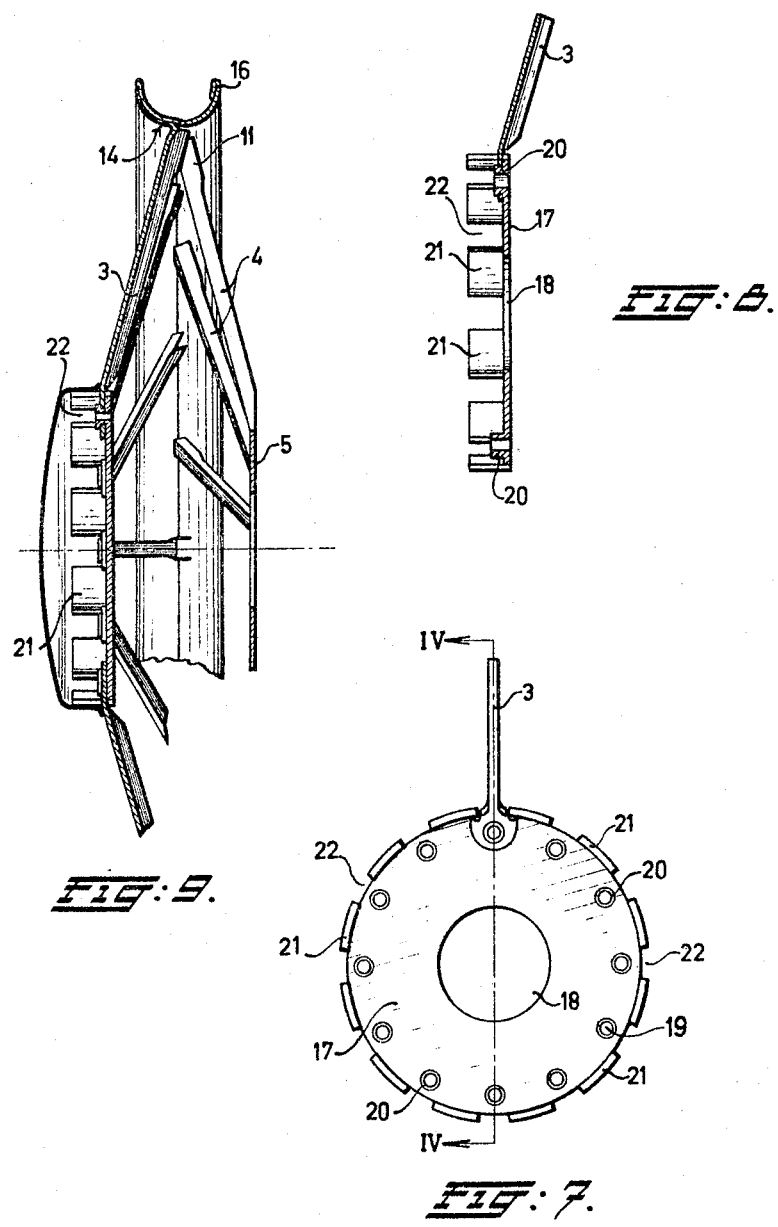
INVENTOR.
JOHANNES H BULLENS
BY
ATTORNEY United States Patent Office 3,270,403
Patented Sept. 6, 1966

3,270,403
METHOD OF MAKING A SPOKED WHEEL
Johannes Hendrikus Bullens, Best, Netherlands, assignor to N.V. Metaalindustrie Caja, Acht (Eindhoven), Netherlands, a limited-liability company of the Netherlands
Filed June 14, 1963, Ser. No. 287,877
Claims priority, application Netherlands, June 18, 1962, 279,852
4 Claims. (Cl. 29—159.03)

The invention relates to a method for the manufacture of a wheel for a light vehicle like a perambulator, a children's automobile, a rumbling waggon or the like, which wheel consists of a rim, a number of spokes and two hub holders, the latter being positioned on either side of a symmetry plane, which intersects the rim, the connection points of the rim with all spokes being situated in the said symmetry plane. It is an object of the method according to the invention to manufacture a wheel that can be produced at a low cost by unskilled labourers and which is moreover firm and of good appearance.

It was known per se to form a group of spokes for a wheel in one piece with a circumferential ring, but in the known art the two groups of spokes were each made of a separate metal plate, whereby exactly an important object of the invention, to be that all spokes are simultaneously stamped out coherent with a rim or rim part from a single plate, was not obtained.

Further according to known art rather heavy wheels which would be clumsy for light vehicles have been made as perforated sheet wheels, wherein the spoke parts are connected with a ring inwardly extending from the rim of the wheel. This is contradictory to the object of the invention of shaping a light wheel wherein the spokes are comparable with conventional bicycle spokes.

It is a further object of the invention to obtain with the step of stamping out spokes coherent with a rim part from a flat plate at the same time a hub holder coherent with the opposite ends of the spokes.

Another object of the invention is to obtain a simple attachment of the other, separate hub holder to the free ends of a second group of spokes which are also stamped out coherent with the rib part in the same method step by which the above mentioned group of spokes are stamped out coherent as well with the rim part as with a hub holder.

Still another object of the invention is to give a nipple shaped appearance to the connecting part of each spoke to the rim and generally to obtain a light wheel having the appearance of a wheel provided with rod spokes.

It is a further object of the invention to obtain a strong rim from the original metal plate by deforming the circumferential part thereof.

Further objects and the manner in which they advantageously can be obtained will follow from the description hereinafter, wherein the invention will be clarified with reference to the drawings in which an embodiment of the invention is represented. On the drawings:

FIG. 1 is a surface view on a partially stamped out plate of which a light wheel is to be made,
FIG. 2 is a fragment of FIG. 1 drawn on a larger scale,
FIG. 3 is a section of a spoke on the line II—II in FIG. 2, after setting,
FIG. 4 is a spoke section on the line III—III in FIG. 2, after setting,
FIG. 5 represents a step in the manufacture of the rim in cross section,
FIG. 6 is a cross section of a completed rim,
FIG. 7 is a hub holder, a spoke being secured thereto,
FIG. 8 is a cross section of the hub holder on the line IV—IV in FIG. 7 viewed in the direction of the arrows and FIG. 9 is a cross section through a perambulator wheel.

In the figures 1 denotes a round disc of steel plate. An even number of substantially wedge shaped pieces 2 has been stamped out from this plate strips 3 and 4 remaining therebetween. The strips 4 remain coherent with an annular plate portion 5, except for the small notches 6 provided at their foot (FIG. 2). The strips 3 are severed from the ring 5 and provided with an aperture 7 in such a way that an eye 8 is formed bearing two small side wings 9. Beside a fixed strip 4 there is always situated a strip 3 of which the lower end is free. In all there are 24 strips.

The upper end of all strips 3 and 4 are coherent with a ring 10. These upper ends have on either side broadenings or tabs 11, the connection of the said tabs with the ring 10 being cut through on either side of the central portion 12 (FIG. 2).

These tabs 11 are bent at right angles by a pressing operation so that the strips 3 and 4 are brought into a channel shaped form (FIG. 3). The bottoms 12 of all channels are located on the same side. Also the remaining portion of each strip 3 and 4, excepted the eye 8, is bent to a U-shape (FIG. 4) of smaller diameter, all bottoms 13 of all U's being situated again on the same side as the bottoms 12.

In this way the aspect of nippled rod spokes is obtained as the bottoms 12, 13 are situated on the outer side of the wheel.

Now the group of strips 4 together with the ring 5 is laterally bent away from the symmetry plane (FIG. 9). The group of strips 3 is bent to the other side of the symmetry plane, the eye shaped ends 8 however being maintained in a plane parallel to the plane of the ring 5.

The rim of the wheel to be manufactured is formed as follows. As is represented in FIG. 5 the ring 10 is deformed so as to obtain a U-shaped cross section having a short leg 14 coherent with the spokes 3 and 4 and a long leg 15 parallel to the short leg 14. Then this long leg 15 is deformed so as to obtain the normal rim shape as shown in FIG. 6, wherein the short leg 14 is forced against the rim wall 14 so that one half of the rim is double walled. The edge of the long leg 15 is provided with a bead 16. One hub holder 17 (FIGS. 7 and 8) consists of a circular plate, provided with a central aperture 18 and a circle of perforations 19 the number and mutual distance thereof corresponding with the number and position of the spoke ends of the group of spokes 3. The material pierced out from the holes 19 has the shape of hollow rivets around which the apertures of the eye shaped spoke ends 8 are fitted and riveted.

The circumference of the ring 17 is provided with projections 21 perpendicular to the plane of the ring and the ends 8 of the spokes 3 fit exactly in the spaces 22 between these projections 20. The spokes are further secured by the fact that the small wings 9 on each side of the eyes 8 rest against the inner sides of the projections 21.

In the described way a relatively light wheel is manufactured at a low cost price, this wheel having a great strength and a fair appearance. The spokes are strong and even when viewed from a short distance they give the impression of normal rod spokes having rim nipples: since the troughs in the U-shaped spokes are all turned to one side of the wheel they give the impression to be solid when contemplated from the other side.

It has been found that the liquid of the bath, in which the finished wheels are nickel- or chromium-plated or covered with another metal, will not enter the troughs in the spokes which is advantageous as it would hardly be possible to remove it therefrom.

The projections 21 can further be used to hold a wheel cap as shown at the left in FIG. 9.

Though in the example the hub holder 5 is shown as a part of the original plate 10, such hub holder could be provided in the same way as the hub holder 17. The wedge shaped segments need not be provided so as to be uniformly distributed over the circumference of the wheel, neither is it always necessary or desirable that there is an equal number of spokes on either side of the symmetry plane. The spokes on the one side may also have a greater diameter than the spokes on the other side.

What I claim is:

1. A method of making a spoked wheel comprising cutting from a flat, circular metal plate a series of angularly spaced, radial directed, wedge-shaped pieces which, at their ends, are spaced from the periphery of the plate and from the center of the plate, thereby to define, between the resulting cutouts, a series of spokes joined at their outer ends to a continuous rim-forming annular portion and at their inner ends to a central portion destined to form a first hub-holder, severing the alternate spokes from said central portion to form eyes at inner ends of said alternate spokes, bending each of said spokes into a U-shaped cross-section along a length of the spoke between the opposite ends thereof, bending said annular portion into a U-shaped cross-section opening at one side and having a relatively short inner leg extending from the spokes perpendicular to the original plane of the plate and a relatively long outer leg also perpendicular to said original plane, then bending said outer leg against said inner leg to form a rim of generally U-shaped cross-section opening radially outward and having a double-wall at one half of the rim where a portion of said outer leg lies against said inner leg, bending said alternate spokes having eyes at their inner ends so that the latter are to one side of a plane extending through the center of said rim, forming a disk with a circular series of projections extending perpendicularly therefrom and being spaced apart by distances corresponding substantially to the width of said spokes at the inner ends thereof, engaging said inner ends of the spokes having eyes between successive projections of said disk, and securing said eyes to said disk so that the latter constitutes a second hub-holder.

2. The method as in claim 1; further comprising punching holes in said disk at locations between said projections and spaced radially inwardly therefrom and pressing the material of said disk around each of said holes into a hollow rivet-forming tube; and wherein each of said eyes receives a related one of said hollow rivet-forming tubes, and said eyes are secured to the disk by upsetting the edge portions of said rivet-forming tubes against said eyes.

3. The method as in claim 1; wherein said eyes are wider than the respective spokes at the inner ends of the latter, and said eyes bear radially outward against said projections between which the respective spokes are inserted.

4. A method of making a spoked wheel comprising cutting from a flat, circular metal plate a series of angularly spaced, radial directed, wedge-shaped pieces which, at their ends, are spaced from the periphery of the plate and from the center of the plate, thereby to define, between the resulting cutouts, a series of spokes joined at their outer ends to a continuous rim-forming annular portion and at their inner ends to a central portion destined to form a first hub-holder, severing the alternate spokes from said central portions to form eyes at inner ends of said alternate spokes, bending each of said spokes into a U-shaped cross-section along a length of the spoke between the opposite ends thereof, bending said annular portion to form a rim of generally U-shaped cross-section opening radially outward, bending said alternate spokes having eyes at their inner ends so that the latter are to one side of a plane extending through the center of said rim, forming a disk with a circular series of projections extending perpendicularly therefrom and being spaced apart by distances corresponding substantially to the width of said spokes at the inner ends thereof, engaging said inner ends of the spokes having eyes between successive projections of said disk, and securing said eyes to said disk so that the latter constitutes a second hub-holder.

References Cited by the Examiner

UNITED STATES PATENTS

| | | | |
|---|---|---|---|
| 1,346,829 | 7/1920 | Lachman | 301—64 |
| 1,354,221 | 9/1920 | Shoemaker | 301—64 |
| 1,494,813 | 5/1924 | Schenck et al. | 29—159.03 |

JOHN F. CAMPBELL, *Primary Examiner.*

THOMAS H. EAGER, *Examiner.*